| United States Patent [19] | [11] 3,930,031 |
| Kealy | [45] Dec. 30, 1975 |

[54] SYNERGISTIC FLAVOR ENHANCING COATINGS FOR CAT FOOD COMPOSITIONS COMPRISING CITRIC AND PHOSPHORIC ACIDS

[75] Inventor: Richard D. Kealy, Waterloo, Ill.

[73] Assignee: Ralston Purina Company, St. Louis, Mo.

[22] Filed: Apr. 7, 1975

[21] Appl. No.: 563,938

Related U.S. Application Data

[63] Continuation-in-part of Ser. No. 487,526, July 11, 1974, abandoned.

[52] U.S. Cl. ............ 426/89; 426/92; 426/94; 426/99; 426/293; 426/295; 426/303; 426/307; 426/534; 426/805
[51] Int. Cl.² ............................................ A23K 1/18
[58] Field of Search ............ 426/89, 92, 94, 96, 98, 426/99, 291, 293, 295, 303, 307, 805, 302, 533, 534, 559, 560, 623, 656, 658

[56] References Cited
UNITED STATES PATENTS

| | | | |
|---|---|---|---|
| 1,318,174 | 10/1919 | Plaisance | 424/127 |
| 3,030,213 | 4/1962 | Tidridge et al. | 426/222 |
| 3,115,409 | 12/1963 | Hallinan et al. | 426/371 |
| 3,139,342 | 6/1964 | Linskey | 426/374 |
| 3,679,429 | 7/1972 | Mohrman et al. | 426/805 |

*Primary Examiner*—Norman Yudkoff
*Assistant Examiner*—Curtis P. Ribando
*Attorney, Agent, or Firm*—Virgil B. Hill

[57] ABSTRACT

A cat food composition of improved acceptability to cats is provided as well as a process for generally enhancing the palatability of dried or intermediate moisture cat foods wherein the cat food composition is coated with a synergistically effective flavor enhancing mixture comprising between about 87 to 13 parts by weight of phosphoric acid to 1 part by weight of citric acid wherein said coating is applied on the composition to provide a level of phosphoric acid in the cat food product of at least about 0.5% by weight. Cat food compositions containing the synergistically effective coating are significantly more palatable to cats than compositions which contain only citric or phosphoric acid as palatability enhancers.

32 Claims, No Drawings

SYNERGISTIC FLAVOR ENHANCING COATINGS FOR CAT FOOD COMPOSITIONS COMPRISING CITRIC AND PHOSPHORIC ACIDS

BACKGROUND OF THE INVENTION

This application is a continuation in part of my previously filed application U.S. Ser. No. 487,526 filed July 11, 1974, and now abandoned. This invention generally relates to a food composition having increased palatability for cats, whereby a synergistically effective mixture of acids is used to coat the food composition and provide the improvement in palatability.

Dried animal or pet food products are widely marketed for pets such as cats and dogs. Generally, dried pet foot products sold commercially have a relatively low moisture content of less than about 12% by weight, and provide excellent nutrition for animals because of the lower moisture content which permits a higher degree of nutritional balancing of ingredients. Typically, these dry pet food products, including those specifically for cats, are expanded or puffed products produced by extrusion techniques. Extrusion cooking processes for the production of dry pet foods have been a significant factor in the growth of this market segment, because of the better cooking achieved with this type of process, better mixing of ingredients, as well as the desirable texture achieved with a puffed or expanded product. Dry products produced by this type of process are generally well accepted by the animal, but they are significantly lower in palatability than canned or high moisture products which typically are all meat products with a moisture content above 50% by weight. This problem is especially pronounced with cat foods since cats have long been recognized as sporadic or "finicky" eaters, and they generally ignore dried food products in preference to meat. Therefore, although a dry product for cats is extremely convenient to use by the pet owner and exceptionally nutritious, a need has continuously existed for additives or ingredients which can be included in the food product to increase palatability of the product to cats but without reducing the nutritive properties.

An obvious solution to overcoming the reduced palatability of dry cat foods is to increase the moisture content to a point where the cat will more readily accept it, but to a point which is below the level of moisture at which canning or sterilization of the product is required for maximum bacteriological stability. This has been satisfactorily achieved in the so-called intermediate moisture cat foods wherein the moisture content of the product is between about 15 and 45% by weight, and the water activity of the product is controlled to provide bacteriological and mycotic stability. Typical food products wherein sugar solutions, and water soluble solids of this type are used to provide bacteriological stability are characterized in U.S. Pat. Nos. 3,202,514; 3,482,985; 3,516,838; 3,615,652 and 3,653,908. Alternative preservative systems, suitable in this type of product are characterized in U.S. Pat. No. 3,852,483 wherein a propylene glycol and glyceride starch conditioner cooperatively provide bacteriological and mycotic stability. Other preservatives suitable for food use, which are bactericidal in nature may also be used to stabilize the product bacteriologically by "killing" the bacterial population and controlling the same. While these types of products are relatively palatable to cats, they are still not on par with the high moisture products and they suffer from the deficiency that often the preservative system which is needed for this type of product depresses palatability below that obtained for the same product but without the preservative. Furthermore, in these and dry products, ingredient formulation becomes exceptionally critical and particularly cannot be altered by the use of ingredients of equal nutritive properties unless one can be sure that the alternative ingredient does not depress palatability. The formulation of these types of products, therefore, becomes complex since each ingredient used must be evaluated for its relative effect on palatability of the product. This, of course, reduces the flexibility in formulation that a pet food manufacturer would like to have. Therefore, the need for flavor enhancing additives for cat foods has not been obviated solely by the introduction of intermediate moisture food products.

U.S. Pat. No. 3,679,429 describes a cat food composition of enhanced palatability to cats which is achieved by the addition of various flavor enhancing acids with phosphoric, citric and hexamic acid being the most preferred acids to boost palatability. The use of flavor enhancing acids such as these, on dry and intermediate moisture cat foods to increase palatability has proven to be commercially successful since cat foods containing added amounts of these flavor enhancing acids are significantly more palatable to cats than cat foods which do not contain these acids. The individual acids used for palatability enhancement can be added in amounts which range from 0.05 to 5% by weight of the cat food, with a preferred range of addition for phosphoric acid being 0.35 to 1% and for citric acid 0.5 to 1%. Despite the significant palatability boost achieved with this type of enhancer, nevertheless, an even more effective flavor enhancer would further advance the state of the art.

The present invention represents a significant improvement over the above described unique cat food compositions and methods of enhancing palatability, in that synergistically effective mixture of flavor enhancing acids is employed to achieve a higher palatability response than is possible by the use of each acid individually. Critically defined ranges for the synergistic mixture are set forth as well as the level of addition to the cat food material, over which this synergistic effect on palatability is achieved.

It is, therefore, an object of the present invention to provide a cat food composition which is more palatable to cats than previously described compositions, including those containing various flavor enhancers.

It is a further object of this invention to provide a method of enhancing the palatability of a cat food material which generally has a moisture content below 50%, therefore, being of the dry or intermediate moisture type.

It is also an object of this invention to provide a unique combination of flavor enhancing acids which when present in critically defined properties and when added to cat food compositions produces a synergistic palatability response thereby making the cat food composition with the mixture more palatable than the same composition with the same amount of each individual acid.

It is a further object of the present invention to provide a process for the enhancement in palatability of a cat food material which is generally useful and easy to apply on a commercial scale.

SUMMARY OF THE INVENTION

A cat food composition of improved acceptability and palatability to cats is provided wherein a palatability enhancing mixture is applied to discrete particles of the cat food composition as a coating to enhance its palatability. The palatability enhancing mixture of the present invention comprises a mixture of phosphoric acid and citric acid, wherein the phosphoric and citric acids are present in said mixture in critically defined percentages. It was unexpectedly discovered that if these two acids are combined to form a mixture comprising between about 87 to 13 parts by weight of phosphoric acid to 1 part by weight of citric acid, and if this mixture is applied to the cat food material in an amount sufficient to provide a level of phosphoric acid in the material of at least about 0.5% by weight, synergism occurs between these components of the mixture to provide a cat food which is more palatable to cats than compositions which contain identical proportions of citric or phosphoric acid by themselves. Cats significantly prefer the cat food compositions of the present invention which have been coated with the synergistically effective mixture over cat foods which are without any such additive or cat foods which only contain a single acid.

The present means of enhancing the palatability of cat food compositions have been found to be applicable to a wide range of commercial cat food products but specifically with regard to cat foods having a moisture content of less than about 50% by weight, therefore encompassing dry and intermediate moisture cat foods. As previously noted, this type of product has a greater need for a palatability enhancing additive than does a high moisture canned cat food which can depend on a high moisture level and the use of fresh meat tissue to retain a high degree of acceptability.

Various processes and methods of providing increased palatability may be employed with the cat food compositions including applying the synergistically effective mixture to the cat food material without the addition of fat or applying it commensurate with a fat coating on the product either as the inner or outer layer, or uniformly mixed and dispersed in the fat. In any event, the presence of both acids in synergistically effective proportions at the surfaces of the particles provides the maximum degree of taste sensor response by the cats thereby resulting in a significant improvement in palatability.

DESCRIPTION OF THE PREFERRED EMBODIMENTS

The cat food compositions and the methods of enhancing the palatability to which the present invention is intended to apply, generally relates to a nutritionally balanced mixture of proteinaceous and farinaceous ingredients, wherein the resulting product has a moisture level of less than about 50% by weight. It may, therefore, by said that the present invention is intended to apply to dried or intermediate moisture pet foods, as these terms are known to a person skilled in the art of pet food formulation and manufacturing. The cat food compositions of the present invention to which the synergistically flavor enhancing coating is added is not intended to be restricted by any specific listing of ingredients since these will be entirely dependent on the nutritional balance of the ration desired as well as availability to the pet food manufacturer. Generally, aside from the nutritional balancing additives included in these products such as the vitamins and minerals or the other additives such as preservatives and emulsifiers and the like, commercial cat food compositions for the most part consist of ingredients which may either be termed substantially proteinaceous or materials which may be substantially farinaceous. Although the following should not be considered limiting, a proteinaceous ingredient could be defined as any material having a protein content of at least about 15% by weight whereas a farinaceous material has a protein content substantially below this and has a major fraction of starchy or carbohydrate containing materials. Examples of proteinaceous materials which are typically used in commercial pet foods including cat foods are vegetable protein meals, such as soybean, cottonseed, peanut, animal proteins such as casein, albumin, and, of course, meat tissue including fresh meat as well as rendered or dried "meals" such as fish meal, poultry meal, meat meal, meat and bone meal and the like. Other types of proteinaceous materials include microbial protein such as yeasts, and other types of protein include materials such as wheat gluten or corn gluten.

Examples of typical farinaceous materials are grains such as corn, milo, alfalfa, wheat, soy hulls, and various other grains which are relatively low in protein. Numerous other materials could be added to cat food compositions which do not necessarily fall into either category, such as dried whey, and other dairy by-products or carbohydrates and the present invention is not intended to be limited by a specific combination of ingredients which should be used to formulate a cat food material.

Although the following is neither intended to be limiting since it is irrelevant to the function of the synergistic flavor enhancing coating of the present invention; nevertheless, for a complete understanding of the present invention it should be recognized that the term cat food composition or cat food material is generally intended to apply to commercially sold, nutritionally balanced products, and these products meeting this definition may be easily characterized as having a minimum protein level since there is a certain minimum level of protein at which cats will effectively be maintained when the cat food composition provides their sole food intake. Cat food compositions which are commercially sold typically have a minimum protein content which is dependent upon the age of the animal to which it is to be fed or if the animal is mature, whether or not it is involved in breeding or reproduction. Therefore, cats when breeding require a minimum protein level of at least about 28% by weight on a 90% dry matter basis in the cat food composition. Kittens are also in the same category, and require a minimun protein level of at least about 28% by weight on a 90% dry matter basis in the cat food. Mature cats, on the other hand, not involved in reproduction require a minimum protein level of at least about 20% by weight on a 90% dry matter basis in the cat food composition, depending on the exact type of proteinaceous source employed or preferably at least about 25% by weight and more typically at least about 30% by weight protein on a 90% dry matter basis in the product. As noted, all of these figures are based on the assumption that the cat food composition provides the sole food intake for the cats and therefore resultant commercial cat food compositions typically contain a minimum protein level of at least about 20% by weight on a 90% dry matter basis in the product in order to meet the nutritional requirements of any type of cat.

This minimum level of protein in cat foods which characterizes commercially sold cat food products is contrasted with commercially sold, nutritionally balanced, dog food compositions which normally have minimum protein requirements which are significantly lower than cat foods. For example, while puppies or females involved in breeding would have a minimum protein requirement of at least about 20% by weight and preferably about 20–25% by weight, on a 90% dry matter basis in the product, dogs not in either of the above two categories would require a minimum protein level of at least about 15% by weight, on a 90% dry matter basis in the product. As stated above, these figures are also with the assumption that the composition provides the sole source of food for the dog. The above figures are also measured on a 90% dry matter basis, therefore, the minimum protein content of the cat food composition itself including the moisture level will vary from these figures if the moisture content is taken into account. Therefore, although the flavor enhancing mixture is applicable to cat foods in general as a means of enhancing palatability without regard to the level of protein; nevertheless, for the purpose of distinguishing commercial cat food compositions from other foodstuffs in general they can be said to comprise a nutritionally balanced mixture of various proteinaceous and farinaceous ingredients having a protein content of at least about 20% by weight but preferably at least about 25% by weight or preferably 30% by weight on a 90% dry matter basis.

The flavor enhancing mixture of the present invention which is used to coat discrete particles of cat food material comprises a mixture of phosphoric and critic acid wherein the phosphoric acid is present in an amount of about 87 to about 13 parts by weight of the mixture to 1 part by weight of citric acid. At this critically defined range, the mixture exhibits a palatability response when added to cat food, which can be termed as synergistic in nature. In other words, the resultant effect on palatability of the cat food material by the mixture is greater than that which can be achieved by the use of equal amounts of either phosphoric or citric acid. When the ratio of phosphoric to citric acid is above or below the noted range, no significant improvement in palatability is seen beyond that which can be obtained with the same level of phosphoric or citric acid individually. The phosphoric and citric acid, therefore, unexpectedly provides a synergistic palatability response when used in combination, and particularly when the mixture which comprises between about 87 and 13 parts by weight of phosphoric acid to 1 1 part for citric acid is added to the cat food composition in an amount which is sufficient to provide a level of at least about 0.5% phosphoric acid in the cat food material. Preferred levels of the mixture in the cat food composition at which the synergistic response is noted, is that level of the above mixture which is sufficient to provide a level of phosphoric acid in the material of about 0.7% by weight.

There is, however, no real upper limit on the amount of the mixture which may be added to the food and based on which the synergistic effect is noted, since the upper limit is more than likely determined by the need for retaining a desirable calcium phosphorus balance in the ration which might be disrupted depending on the ingredients of the ration if the phosphoric acid level becomes too high, or a high level of acid could disrupt the nutritional or physical characteristics of the food product. Typically, therefore, the mixture will be added to the food material in an amount which prevents the phosphoric acid level in the feed from exceeding about 5% by weight, preferably 3% by weight.

The citric and phosphoric acids which comprise the synergistically effective flavor enhancing mixture of the present invention are not intended to be limited in terms of their actual concentration or by their physical form whether they be anhydrous, hydrated and the like, with the exception that the concentration of the acids which are referred to in the present invention are based on the assumption that the phosphoric or citric acids are of 100% purity, for simplification, when in fact that they may be commercially available or may be employed in the present invention at any particular concentration or purity. As stated above, the citric acid can either be hydrated or anhydrous and the particular crystalline form does not limit the present invention. Typically, the phosphoric acid which is used and commercially available is between about 60 to 85% phosphoric acid whereas the citric acid in either anhydrous or hydrated form may for purposes of the present invention be considered to be of essentially 100% purity. The acids are preferably combined in the form of an aqueous solution for application to the product since the maximum degree of uniformity on the product is achieved by coating of the particles of the food with a solution of the mixture. The uniformity of the mixture by the solution coating process, of course, is preferred to provide a synergistic response on cats although the synergistic response has also been obtained by dusting on of the powdered dried acid, such as citric acid, and the present invention is not intended to be limited in this regard.

It is preferred, although not limiting in the present invention, that an edible fat be used together with the synergistically effective coating of flavor enhancing acids on the cat food material. The fat typically is included in commercial cat food compositions to provide an energy source for the animal and as such is usually applied as a coating to the cat food product. Although the best results are obtained with the synergistically effective acid mixture of the present invention when a fat is used commensurate therewith, it should not in any manner be considered limiting since a synergistic palatability response for cats is still attained with the acid mixture without the addition of fat. Neither is the specific type of fat which is suitable for use in the instant invention considered critical since the exact type employed will be dependent on availability and free fatty acid content. Typical fats employed are animal fats such as lard and tallow. The particular level of fat employed is further not critical to the functionality of the synergistically effective coating of the present invention and is entirely dependent on the nutritional characteristics desired of the cat food. Typical levels of fat which are employed together with the acid coating are between about 5 and 12% by weight of the cat food composition.

The synergistically effective acid mixture of the present invention which comprises a mixture of between about 87 to 13 parts by weight of phosphoric acid to 1 part by weight of citric acid, is applied as a coating to the cat food composition which may be of the dried or intermediate moisture type at a level which is sufficient to provide a level of phosphoric acid in the cat food composition of at least about 0.5% by weight.

Insofar as the application of the coating to the product, as previously noted, it is preferred to apply the acid mixture as an aqueous solution to the product to provide a uniform distribution of the acid mixture on the surfaces of the particles and thereby assume maximum availability of the acids to the taste receptors of the cat. Therefore, insofar as the present process of enhancing the palatability of a cat food material is concerned, the acids usually and preferably will be dissolved in an aqueous solution of any concentration desired to provide the required level of acids in the final product. Depending on the specific type of cat food composition being produced, i.e., dried or intermediate moisture, the synergistically effective acid mixture can be applied as a first coating for the cat food product followed by a second coating of an edible fat over the acid coating. Alternatively, the fat coating can be applied first, followed by a second but outer coating of the acid mixture. A simple and preferred means is to form a dispersion of the concentrated synergistically effective acid mixture and an edible fat, and apply this dispersion on the surface of the cat food particle; this eliminates the need in a commerical production system of two separate spraying steps. In any event, the particular sequence followed is not critical to the practice of the present invention and a significant palatability boost is achieved regardless of the sequence or order of addition of either the acid or fat. Typically, the fat or the fat acid mixture are heated to insure the fat is completely liquid prior to application by spraying since this facilitates spraying of the fat on the cat food product.

Insofar as the production of dried pet foods and the present process of enhancing the palatability thereof, dried cat food particles such as those of the expanded or extruded type are dried to a moisture level below about 15% by forced air and then conveyed while in a somewhat heated condition to a spray chamber by a belt conveyor. Into the spray chamber is introduced a dispersion of the acid mixture and melted fat, which is separately formed in a mixing tank or metering pump by blending the requisite level of fat and acid material from separate storage tanks for these materials. The acid fat dispersion is then sprayed on the cat food particles to provide the desired level of fat and enough of the acid mixture to provide a level of at least about 0.5% by weight of phosphoric acid on the cat food product. Following coating, the spray coated cat food particles are collected at the bottom of the spray chamber and can then be conveyed if desired to a tumbling drum or similar apparatus wherein the coated particles are repeatedly tumbled to improve uniformity of the coating. The coated cat food particles are then removed from the tumbling drum and cooled to ambient temperature.

If it is desired to apply the acid and fat as separate coatings on the cat food product, successive spray chambers are provided for application of the acid mixture, and for the application of fat after which the sequentially coated cat food particles can be tumbled in a drum to promote uniformity of the coatings as described above prior to being cooled to ambient temperature and packaged.

Typically, in the production of an intermediate moisture animal food it is produced as small cylinders or pieces of product at a moisture level of about 25%. These moist pieces can be conveyed to a tumbling drum or similar apparatus, in which the moisture content can be adjusted to the level desired in the final product, if it is above the initial moisture content of the pet food. Adjustment of the moisture content is achieved by spraying the product with water until the moisture content is at the desired level. Then, depending on the desired means of enhancing palatability of the product, the acid mixture and fat can be applied as separate, successive coatings by passing the particles through successive spray chambers for applying the acid coating and the fat, or alternatively by forcing a dispersion of the fat and acid and applying these in a single spraying step. After coating, the forced intermediate moisture pet food product is then suitable for packaging.

Application of the synergistically effective mixture of citric and phosphoric acids provides a higher degree of palatability response from cats than is obtainable by the application of either acid by itself. In this manner, a significant improvement is made in pet food formulation, specifically in the dried or intermediate moisture pet food area, where palatability of the product to the pet is the controlling factor in the commercial success of such a product.

Pursuant to a better understanding of the instant invention, the following examples describe illustrative but non-limiting embodiments of the present invention.

EXAMPLE 1

A cat food composition was formulated by mixing the following ingredients in the indicated proportions by weight:

| | |
|---|---|
| Ground Yellow Corn | 16% |
| Ground Wheat | 10% |
| Ground Oats | 1% |
| Dried Brewers Yeast | 1% |
| Wheat Germ | 2% |
| Soybean Meal (50% protein) | 16% |
| Corn Gluten Meal | 6% |
| Fish Meal | 2% |
| Poultry Meal | 18% |
| Dried Whey | 6% |
| Vitamins and Minerals | 3% |
| Fish Solubles | 3% |

This mixture was then transferred to a mixer conditioner and subjected to steam and moisture to adjust the moisture content to between about 20 and 40% by weight. The conditioned mixture was then extruded under conditions of elevated temperature and pressure to form a continuous strand of expanded product which was segmented into individual particles or pieces by a rotating cutting knife upon exit of the strand from the extruder. The pieces were then conveyed to forced air drying system and the moisture level reduced to below about 10% by weight. The dried extruded cat food particles after exit from the forced air oven and prior to cooling are carried from the dried to a spray chamber by a belt conveyor. The pieces were dropped from the conveyor belt in a sheet and fell through the spray chamber. Spray heads located on both sides of the falling sheet sprayed a dispersion of an acid mixture and a melted fat on the hot pieces as they fell through the spray chamber. This dispersion comprised an aqueous concentrated solution of acids with 98 parts by weight of 70% phosphoric acid, 1 part by weight of citric acid and 1 part of water and melted tallow. The dispersion was formed by conducting tallow melted at about 140°F. and the acid mixture from a storage tank, wherein the indicated portions of acids were mixed.

The pump blended the fat and acid and the dispersion was sprayed on the cat food particles so as to provide a level of the acid mixture to a level of phosphoric acid in the coated product of about 0.7% by weight and with a ratio by weight of phosphoric acid to citric acid of about 70:1 in the coated product. The spray coated cat food particles were collected at the bottom of the spray chamber and conveyed to a tumbling drum. The tumbling drum was maintained at a temperature above the melting point of the fat, and the pieces were tumbled until they had a substantially uniform coating of the fat and the acid mixture. The coated food particles were then removed from the drum and cooled to ambient temperature. The resultant dried cat food composition had a moisture content less than about 12% by weight, a protein content above about 30% by weight on a 90% dry matter basis and a coating containing about 7% by weight of added fat and an acid mixture comprising about 0.7% by weight of phosphoric acid and .01% by weight of citric acid.

EXAMPLE 2

The dried extruded cat food particles produced as in Example 1 were carried to the top of a spray chamber by a belt conveyor. The particles were dropped in a sheet and fell through the spray chamber. Spray heads located on both sides of the sheet sprayed an acid mixture comprising 98 parts by weight of phosphoric acid (70%), 1 part by weight of citric acid and 1 part of water, to provide a level of phosphoric acid in the final product of 0.7% by weight. The acid coated particles were collected and conveyed to a second spray chamber. The particles which had the first coating of the acid mixture were dropped in a sheet through the second spray chamber and were spray coated with fat heated to about 140°F. The fat coated particles were collected at the bottom of the second spray chamber and were conveyed to a tumbling drum which was maintained at about 140°F. The coated particles were tumbled in the drum until a substantially uniform coating was provided, followed by removal from the drum and cooling to ambient temperature. The coated pieces had a moisture content below about 12%, a protein content exceeding 30% on a 90% dry matter basis and a first coating of 0.7% phosphoric acid and .01% citric acid by weight of the particle, and a second outercoating of 7% fat.

EXAMPLE 3

The dried extruded cat food particles produced as in Example 1 were carried to the top of a first spray chamber by a belt conveyor. The particles were dropped in a sheet and fell through the spray chamber. Spray heads located on both sides of the falling sheet sprayed melted animal fat heated to about 140°F. on the particles. The fat coated particles were collected at the bottom of the first spray chamber and conveyed to a tumbling drum where they were tumbled in the drum at a temperature of about 140°F. for several minutes to provide a substantially uniform first coating of fat on the product. The fat coated particles were then removed from the drum and conveyed to a second spray chamber where they were sprayed with an acid mixture comprising 98 parts by weight of 70% phosphoric acid, 1 part by weight of citric acid, and 1 part by weight of water. The acid coated particles were then collected, cooled and packaged. They were determined to have a first coating of fat in an amount of about 7 % by weight of the product, a second outer coating comprising about 0.7% by weight of phosphoric and .01% by weight of citric acid.

EXAMPLE 4

To demonstrate the unexpected synergistic response insofar as palatability improvement, when a mixture of phosphoric acid and citric acid is used with a cat food composition, a commercial cat food composition produced generally pursuant to Example 1 and marketed commercially under the name of Purina Cat Chow, was coated with a dispersion of fat and the synergistically effective flavor enhancing acid mixture at various levels and ratios of acids within the critically defined range of addition, and comparatively tested against a control of the same product which was coated with only a dispersion of fat and phosphoric acid in the indicated percentages. The control ration in this instance contained a coating of fat in an amount of about 7% which included a level of 0.35% by weight of phosphoric acid. The test samples which were comparatively evaluated against the control for palatability response when fed either wet or dry to cats, were identical in every respect to the control with the exception that the synergistically effective acid mixture was used at various ratios of acids and amounts of addition to the feed. Each test ration was separately compared against the control for palatability response. The wet feeding to the cats consisted of the addition of 50 grams of water to the 100 grams apportioned quantity of ration containing the acids, immediately prior to feeding.

TABLE I

| Sample | Level of Acids (% by weight) Citric | Phosphoric | Ratio Phosphoric : Citric | Total Consumed(gms.) | Cats Preferred | Cats No Preference | Statistical Significance |
|---|---|---|---|---|---|---|---|
| | | | FED ON A DRY BASIS | | | | |
| Control | — | 0.35% | 72 : 1 | 1659 | 10 | 5 | $P<.05$ |
| No. 1 | .0025% | 0.18% | | 1151 | 3 | | |
| Control | — | 0.35% | 70 : 1 | 1551 | 5 | 8 | Not Significant |
| No. 2 | .005% | 0.35% | | 1371 | 5 | | |
| Control | — | 0.35% | 70 : 1 | 1568 | 3 | 3 | $P<.01$ |
| No. 3 | .0075% | 0.53% | | 2400 | 12 | | |
| Control | — | 0.35% | — | 3026 | 14 | 3 | $P<.01$ |
| No. 4 | .05% | — | | 496 | 1 | | |
| | | | FED ON A WET BASIS | | | | |
| Control | — | 0.35% | 72 : 1 | 4679 | 10 | 4 | Not Significant |
| No. 1 | .0025% | 0.18% | | 3860 | 4 | | |
| Control | — | 0.35% | 70 : 1 | 4706 | 6 | 6 | Not Significant |
| No. 2 | .005% | 0.35% | | 4307 | 6 | | |
| Control | — | 0.35% | 70 : 1 | 3369 | 2 | 6 | $P<.05$ |
| No. 3 | .0075% | 0.53% | | 4107 | 10 | | |
| Control | — | 0.35% | — | 4359 | 11 | 5 | $P<.01$ |

TABLE I-continued

| Sample | Level of Acids (% by weight) Citric | Level of Acids (% by weight) Phosphoric | Ratio Phosphoric : Citric | Total Consumed(gms.) | Cats Preferred | Cats No Preference | Statistical Significance |
|---|---|---|---|---|---|---|---|
| No. 4 | .05% | — | | 2786 | 2 | | |

An examination of the above identified palatability data as set forth in Table 1 on either a wet or dry basis will indicate that when sample 3 containing a mixture of citric acid and phosphoric acid, at a weight ratio of 70:1 and having a phosphoric acid level of 0.53% by weight was comparatively tested against the control it was significantly preferred by the cats over the control ration. By the same token, the control ration containing only phosphoric acid was preferred by the cats over sample No. 1 and no preference was judged in the comparative palatability test with sample No. 2. Samples 1 and 2, while containing the acids of the synergistically effective acid mixture of the present invention, including the claimed weight ratio of phosphoric and citric acid, did not contain the minimum level of addition of the mixture to the ration or a phosphoric acid level of at least about 0.5% by weight. This level of addition has been noted as critical for obtaining a synergistic flavor response at the noted weight ratio of acids. The control ration was also comparatively tested against sample No. 4 which contained only .05% citric acid and it may be seen that the control with phosphoric acid was significantly more palatable than a ration containing only citric acid. It is, therefore, believed that the palatability data clearly indicates the synergistic response obtained when the proper weight ratio of acids is employed together with the correct level of addition of the mixture to the feed, and when fed to the cats on either a wet or dry basis.

EXAMPLE 5

To further demonstrate the synergistic response obtained with the flavor enhancing acid mixture of the present invention and to illustrate the criticality of the ratio of the acids in the mixture together with the level of addition to the feed, various samples of a commercial cat food composition produced generally pursuant to the teachings of Example 1 and marketed under the name Purina Cat Chow was coated with a dispersion of fat and the synergistically effective acid mixture at various levels of addition and at various ratios of acids, and comparatively tested when fed both wet and dry against a control ration which contained only phosphoric acid. The level of fat in the test rations was about 7% by weight. The control ration contained a coating of about 7% fat with a level of 0.70% by weight of phosphoric acid. The wet feeding to the cats consisted of the addition of 50 grams of water to the 100 grams apportioned quantity of ration containing the acids immediately prior to feeding.

Each test ration containing the indicated level of acids was separately tested against the control for palatability response.

TABLE II

| Sample | Level of Acids (% by weight) Citric | Level of Acids (% by weight) Phosphoric | Ratio Phosphoric : Citric | Total Consumed(gms.) | Cats Preferred | Cats No Preference | Statistical Significance |
|---|---|---|---|---|---|---|---|
| | | | FED ON A WET BASIS | | | | |
| Control | — | 0.7% | 140 : 1 | 4696 | 6 | 8 | Not Significant |
| No. 1 | .005% | 0.7% | | 4870 | 10 | | |
| Control | — | 0.7% | 70 : 1 | 4649 | 6 | 3 | P<.05 |
| No. 2 | .01% | 0.7% | | 5738 | 15 | | |
| Control | — | 0.7% | 14 : 1 | 4105 | 3 | 2 | P<.01 |
| No. 3 | .05% | 0.7% | | 5902 | 19 | | |
| | | | FED ON A DRY BASIS | | | | |
| Control | — | 0.7% | 140 : 1 | 3195 | 10 | 5 | Not Significant |
| No. 1 | .005% | 0.7% | | 3215 | 9 | | |
| Control | — | 0.7% | 70 : 1 | 2885 | 0 | 7 | P<0.1 |
| No.2 | .01% | 0.7% | | 3547 | 17 | | |
| Control | — | 0.7% | 14 : 1 | 2798 | 8 | 8 | Not Significant |
| No. 3 | .05% | 0.7% | | 2779 | 8 | | |

As set forth in Table 2 and with reference specifically to Samples 2 and 3, it may be seen that where a mixture of phosphoric and citric acids were employed in weight ratios of 70:1 and 14:1 respectively and where in both Samples the level of addition to the feed was sufficient to provide a level of phosphoric acid of above 0.5%, a significant improvement in palatability was obtained over the control which contained only 0.7% phosphoric acid. With specific reference to Sample 1, it may be seen that no significant improvement in palatability response was obtained with the acid mixture over the control. This was because the ratio of phosphoric : citric acid was above the claimed range even though the level of addition of the mixture to the feed was above the claimed range as evidenced by a phosphoric acid level above about 0.5% by weight. It is, therefore, believed that the above data dramatically demonstrates the criticality of the ratio of acids and minimum level of addition to the feed insofar as the synergistic palatability response obtained with this acid mixture on cats.

A second control ration was prepared identical in every respect to the control employed in the above test with the exception that a level of only 0.35% by weight of phosphoric acid was used in the coating. This control was comparatively tested against the following rations fed on both a wet and dry basis and containing mixtures of citric and phosphoric acid.

TABLE III

| Sample | Level of Acids (% by weight) Citric | Level of Acids (% by weight) Phosphoric | Ratio Phosphoric : Citric | Total Consumed(gms.) | Cats Preferred | Cats No Preference | Statistical Significance |
|---|---|---|---|---|---|---|---|
| | | | FED ON A WET BASIS | | | | |
| Control | — | 0.35% | 70 : 1 | 3720 | 7 | 3 | Not Significant |
| No. 1 | .005% | 0.35% | | 4651 | 14 | | |
| Control | — | 0.35% | 35 : 1 | 4574 | 9 | 2 | Not Significant |
| No. 2 | .01% | 0.35% | | 5113 | 13 | | |
| Control | — | 0.35% | 7 : 1 | 5587 | 15 | 3 | $P<0.5$ |
| No. 3 | .05% | 0.35% | | 4291 | 6 | | |
| | | | FED ON A DRY BASIS | | | | |
| Control | — | 0.35% | 70 : 1 | 3273 | 7 | 6 | Not Significant |
| No. 1 | .005% | 0.35% | | 3339 | 11 | | |
| Control | — | 0.35% | 35 : 1 | 2349 | 9 | 6 | Not Significant |
| No. 2 | .01% | 0.35% | | 2296 | 9 | | |
| Control | — | 0.35% | 7 : 1 | 4522 | 23 | 0 | $P<.01$ |
| No. 3 | .05% | 0.35% | | 1133 | 1 | | |

In the above palatability data as set forth in Table III, the control was comparatively tested against mixtures of phosphoric and citric acid wherein weight ratios of phosphoric to citric acid were within the claimed range with Samples 1 and 2, and not within the claimed range on Sample 3, although with all samples, the level of addition to the feed was outside the claimed range as evidenced by a phosphoric acid level of only 0.35% by weight. It may be seen that no significant improvement in palatability was obtained with these mixtures over the control which contained only phosphoric acid. In fact, in comparison of the control ration to Sample 3 where both the weight ratio of acids as well as the level of addition to the feed was outside the claimed range, it is apparent that the control was significantly more palatable to the cats than feed containing the acid mixture. It is, therefore, believed that this is further evidence of the unexpected synergistic palatability response obtained with the acid mixture of the present invention when it is added, at a critically defined level to the feed, and contains a critically defined ratio of phosphoric and citric acid.

EXAMPLE 6

To illustrate the criticality of the ratio of phosphoric to citric acid insofar as a synergistic palatability response obtained with a mixture of the two acids, a series of samples were prepared pursuant to the teachings of Example 1 containing various ratios of phosphoric to citric acid and comparatively tested against a control ration of identical composition except it contained only 0.7% by weight of phosphoric acid. The samples were fed on a wet basis to cats, with the latter situation including the addition of 50 grams of water to the 100 grams apportioned ration containing the acid immediately prior to feeding. The data obtained and set forth in Table IV dramatically illustrates the criticality of the ratio of the two acids in the mixture in order to obtain a synergistic palatability response with cats.

TABLE IV

| Sample | Level of Acids (% by weight) Citric | Level of Acids (% by weight) Phosphoric | Ratio Phosphoric : Citric | Total Consumed(gms.) | Cats Preferred | Cats No Preference | Statistical Significance |
|---|---|---|---|---|---|---|---|
| Control | — | 0.7% | 117 : 1 | 3037 | 14 | 3 | Not Significant |
| No. 1 | .006% | 0.7% | | 3014 | 7 | | |
| Control | — | 0.7% | 88 : 1 | 2053 | 5 | 8 | Not Significant |
| No. 2 | .008% | 0.7% | | 2645 | 11 | | |
| Control | — | 0.7% | 70 : 1 | 1611 | 2 | 3 | $P<.01$ |
| No. 3 | .01% | 0.7% | | 2518 | 19 | | |
| Control | — | 0.7% | 35 : 1 | 1895 | 1 | 2 | $P<.01$ |
| No. 4 | .02% | 0.7% | | 3456 | 21 | | |
| Control | — | 0.7% | 14 : 1 | 1239 | 1 | 4 | $P<.01$ |
| No. 5 | .05% | 0.7% | | 2560 | 19 | | |

It may be seen from the above data that when the level of addition of the mixture of acids to the ration was sufficient to provide a level of at least about 0.5% phosphoric acid in the feed and the ratio of the phosphoric to citric acid was between about 87 and 14:1 by weight that a significant improvement in palatability was obtained as compared to a ration which contained the same level of phosphoric acid but omitted citric acid. The synergistic effect of the critically defined ranges of citric acid and phosphoric acid is therefore illustrated by the above identified test data.

The above examples are merely illustrative of the instant invention and it will be understood that various other changes in the details, materials or steps which have been described may be made without departing from the spirit of the instant disclosure, and such changes and other modifications are intended to be included within the scope of the instant disclosure and appended claims.

I claim:
1. A cat food composition comprising a nutritionally balanced mixture of proteinaceous and farinaceous ingredients having a coating of a synergistically effective flavor enhancing mixture which comprises between about 87 to 13 parts by weight of phosphoric acid to 1 part by weight of citric acid, wherein said coating is applied to provide a level of phosphoric acid in said cat food composition of at least about 0.5% by weight.

2. A cat food composition as set forth in claim 1 wherein said coating includes an edible fat.

3. A cat food composition as set forth in claim 1 wherein said composition has a protein content of at least about 20% by weight of the total composition on a 90% dry matter basis.

4. A cat food composition as set forth in claim 1 wherein said edible fat is present in said coating in an amount which provides between about 5 and 12% by weight of fat in the cat food composition.

5. A cat food composition as set forth in claim 1 wherein said flavor enhancing mixture comprises about 70 parts by weight of phosphoric acid to about 1 part by weight of citric acid.

6. A cat food composition as set forth in claim 1 wherein said composition has a protein content of at least about 30% by weight of the total composition on a 90% dry matter basis.

7. A cat food composition as set forth in claim 1 wherein said cat food has a moisture content of less then about 50% by weight.

8. A cat food composition as set forth in claim 1 wherein said mixture is added to said cat food composition to provide a level of phosphoric acid in said composition which does not exceed about 3% by weight.

9. A cat food composition comprising a nutritionally balanced mixture of proteinaceous and farinaceous ingredients with a protein content of at least about 20% by weight of the total composition on a 90% dry matter basis having a coating of a synergistically effective flavor enhancing mixture which comprises between about 87 to 13 parts by weight of phosphoric acid to 1 part by weight of citric acid, wherein said coating is applied to provide a level of phosphoric acid in said cat food composition of at least about 0.5% by weight, said coating including an edible fat.

10. A cat food composition as set forth in claim 9 wherein said composition has a protein content of at least about 30% by weight of the total composition on a 90% dry matter basis.

11. A cat food composition as set forth in claim 9 wherein said edible fat is present in said coating in an amount to provide between about 5 and 12% by weight of fat in the cat food composition.

12. A cat food composition as set forth in claim 9 wherein said flavor enhancing mixture comprises about 70 parts by weight of phosphoric acid to about 1 part by weight of citric acid.

13. A cat food composition as set forth in claim 9 wherein said cat food has a moisture content of less than about 50% by weight.

14. A cat food composition as set forth in claim 9 wherein said mixture is added to said cat food composition to provide a level of phosphoric acid in said composition which does not exceed about 3% by weight.

15. A method of enhancing the palatability of a cat food material for cats comprising coating discrete particles of the cat food material with a synergistically effective flavor enhancing mixture comprising between about 87 to 13 parts by weight of phosphoric acid to 1 part by weight of citric acid, wherein said coating is applied to provide a level of at least about 0.5% by weight phosphoric acid in said material.

16. The method of claim 15 wherein an edible fat is included in said coating.

17. The method of claim 15 wherein said edible fat is present in said coating in an amount which provides between about 5 and 12% by weight of fat in said material.

18. The method of claim 15 wherein said mixture is added to said cat food material to provide a level of phosphoric acid in said material which does not exceed about 3% by weight.

19. A method of enhancing the palatability of a cat food material for cats comprising:
a. applying a first coating to particles of the cat food material which comprises a synergistically effective flavor enhancing mixture comprising between about 87 to 13 parts by weight of phosphoric acid to 1 part by weight of citric acid, wherein said coating is applied to provide a level of at least about 0.5% by weight of phosphoric acid in said material and,
b. applying a second coating of an edible fat over said first coating to provide a level of fat in said material of between about 5 and 12% by weight.

20. The method of claim 19 wherein said mixture is added to said cat food material to provide a level of phosphoric acid in said material which does not exceed about 3% by weight.

21. The method of claim 19 wherein the cat food material comprises a nutritionally balanced proteinaceous-farinaceous mixture with a protein content of at least about 20% by weight of the total composition on a 90% dry matter basis.

22. The method of claim 21 wherein the cat food material has a moisture content below about 50% by weight.

23. The method of claim 21 wherein the cat food material has a protein content of at least about 30% by weight of the total composition on a 90% dry matter basis.

24. A method of enhancing the palatability of a cat food material for cats comprising:
a. applying first a coating to discrete particles of said cat food of an edible fat to provide a level of fat in said material of between about 5 and 12% by weight and,
b. applying a second coating of a synergistically effective flavor enhancing mixture comprising between about 87 to 13 parts by weight of phosphoric acid to 1 part by weight of citric acid wherein said second coating is applied to provide a level of phosphoric acid in said material of at least about 0.5% by weight.

25. The method of claim 24 wherein said mixture is added to said cat food material to provide a level of phosphoric acid in said material which does not exceed about 3% by weight.

26. The method of claim 24 wherein the cat food material comprises a nutritionally balanced proteinaceous-farinaceous mixture with a protein content of at least about 20% by weight of the total composition on a 90% dry matter basis.

27. The method of claim 26 wherein the cat food material has a moisture content below about 50% by weight.

28. The method of claim 26 wherein the cat food material has a protein content of at least about 30% by weight of the total composition on a 90% dry matter basis.

29. A method of enhancing the palatability of a cat food material for cats comprising:
a. forming a dispersion of an edible fat and a synergistically effective flavor enhancing mixture which comprises between about 87 to 13 parts by weight of phosphoric acid to 1 part by weight of citric acid, and
b. coating discrete particles of the cat food material with the dispersion to provide a level of fat in the cat food material of between about 5 and 12% and a level of phosphoric acid in said material of at least about 0.5% by weight.

30. The method of claim 29 wherein said cat food material comprises a nutritionally balanced proteinaceous-farinaceous mixture with a protein content of at least about 20% by weight of the total composition on a 90% dry matter basis.

31. The method of claim 30 wherein said cat food material has a protein content of at least about 30% by weight of the total composition on a 90% dry matter basis.

32. The method of claim 30 wherein said cat food material has a moisture content less than about 50% by weight.

* * * * *

UNITED STATES PATENT AND TRADEMARK OFFICE
CERTIFICATE OF CORRECTION

PATENT NO. : 3,930,031
DATED : December 30, 1975
INVENTOR(S) : Richard D. Kealy

It is certified that error appears in the above-identified patent and that said Letters Patent are hereby corrected as shown below:

Column 3, line 59, "by" should read --be--

Column 5, line 53, delete "l" (second occurrence)

Column 8, line 40, the amount for "Dried Whey" should read --.6%--

Signed and Sealed this twenty-ninth Day of June 1976

[SEAL]

Attest:

RUTH C. MASON
*Attesting Officer*

C. MARSHALL DANN
*Commissioner of Patents and Trademarks*